April 22, 1958  G. A. JONES  2,831,458
HEAD HOLDER
Filed Sept. 28, 1955
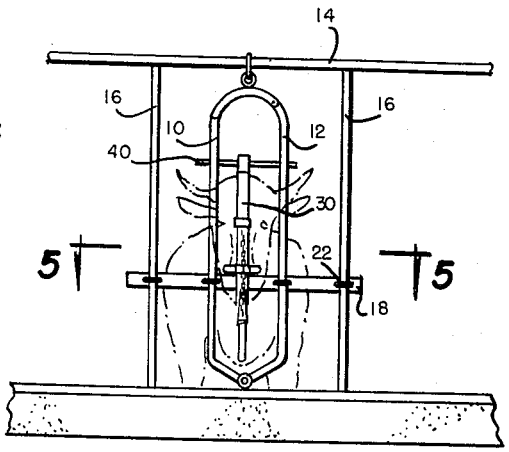
FIG. 1.
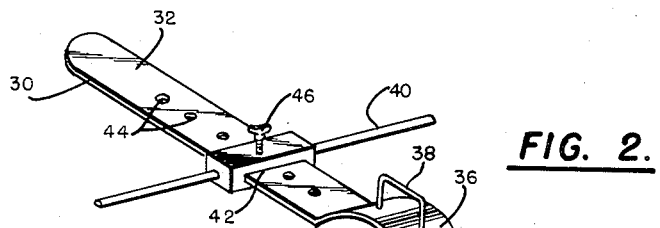
FIG. 2.
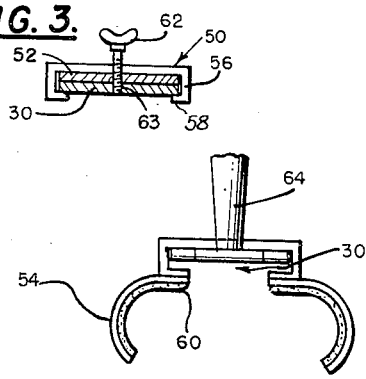
FIG. 3.
FIG. 4.
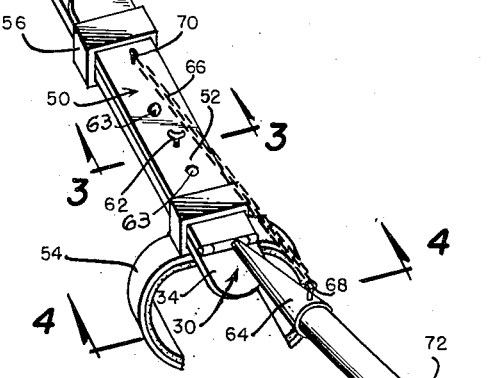
FIG. 5.
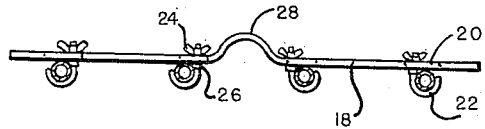
INVENTOR.
GEORGE A. JONES
BY
ATTORNEYS

United States Patent Office 2,831,458
Patented Apr. 22, 1958

2,831,458

HEAD HOLDER

George A. Jones, Sedro-Woolley, Wash.

Application September 28, 1955, Serial No. 537,226

5 Claims. (Cl. 119—98)

This invention relates to stanchion or head holders for cattle and is more particularly concerned with a portable halter for use in holding the heads of cattle rigidly in their head stanchions for the performance of any necessary operation thereon, such as dehorning. Still more particularly this invention relates to an improvement over the stanchion holder forming the subject matter of prior Patent 1,727,290.

An object of the invention is the provision of an improved head holder having means for positively preventing movement of the animal's head in the stanchion, providing the necessary rigidity for operations on the head, and permitting these operations to be performed in the animal's own stall. An important feature of the invention contributing to this end is the provision in connection with an angled neck and head bar having a front downward pressure applying handle and a cross bar adjustably anchored to the head bar of an adjustable nose piece having a curved nose guard disposed transversely of the head bar. The cross bar effectively prevents forward movement of the animal when downward pressure is applied to the handle, forcing the nose down between the stanchions. The transverse nose guard serves to prevent lateral movement and keeps the head bar from slipping to the side of the animal's head.

This and other features and advantages of the invention will be more clearly apparent from the following detailed specification which is to be read in conjunction with the accompanying drawings forming part thereof, and in which:

Figure 1 is a perspective view of the device of the present invention as applied to the head of an animal in the head stanchion of its stall, much of the structure of the stall being omitted for the sake of clearness.

Figure 2 is an enlarged perspective view of the holder, detached.

Figure 3 is an enlarged transverse sectional view through the nose portion of the angled head bar showing the mounting of the sliding member thereon, the section being taken on line 3—3 of Figure 2.

Figure 4 is an enlarged view of the adjustable nose piece taken along line 4—4 of Figure 2.

Figure 5 is an enlarged view of a securing bar used to rigidify the swinging type of stanchion taken along 5—5 of Figure 1.

In Figure 1 the spaced uprights 10 and 12 of the head stanchion of the animal's stall are shown as being of the iron swinging type stanchion, attached to a horizontal rod 14 and having adjacent thereto fixed upright rods 16. Securing bar 18 is shown in position to secure the head stanchion stationary relative to the fixed uprights 16. There are four slots 20 (Fig. 5) into which are set U bolts 22. Wing nuts 24 adjust and tighten securing bar to the upright members 10, 12, and 16 as shown in Figure 1. Shoulders 26 on U bolts 22 prevent the bolts from slipping through slots 20 when securing bar 18 is not in use and is carried from stall to stall. Bend 28 on securing bar 18 accommodates the jaw of the animal when the head holder is set in place as shown in Figure 1.

The head holder itself comprises an angled head and neck bar 30 hereinafter termed the head bar, having a rear or neck portion 32 overlying the animal's neck and a front or head portion 34 overlying the head including the nose. The front and rear portions are connected by a curved section 36 generally adapted to fit the top of the animal's head. A handle 38 is provided on head bar 30 to facilitate carrying the member from stall to stall.

Mounted on the neck portion 32 of the head bar 30 for longitudinal adjustment thereon to engage the stanchion bars 10, 12 is a transversely extending cross bar 40 having ends spaced by a central channelled portion 42 of an internal cross section adapted to slide longitudinally on the neck portion 32. The top surface of neck portion 32 of head bar 30 is provided with a plurality of countersunk depressions 44 any of which cooperates with a wing bolt 46 to fix the position of the cross bar 40 relative to head bar 30.

Mounted on the nose portion 34 of head bar 30 is an adjustable nose piece 50 comprising a flat bar 52. A curved nose guard 54 is rigidly secured on bar 52, as is also at least one slide 56. As shown in Figure 3, slide 56 is preferably turned under at the ends 58 just enough to provide a sliding groove for cooperation with nose portion 34 of head bar 30. Similarly nose guard 54 overlaps the under side of nose portion 34 to incorporate turned under sections 60 which permit combining the nose guard function with the function of slide 56 in a single member. If desired, of course a second slide like 56 may be provided on nose piece 50. Slide members completely overlapping the underside of nose portion 34 would provide a ridge that could bruise an animal's nose. On the other hand by providing a minimum overlap by nose piece 50, through means of the structure of slide 56 and guard 54 as described above, the under surface of the nose portion 34 is left substantially unobstructed and smooth enough so that the animal will not be bruised.

Nose piece 50 may be secured in desired position on nose portion 34 by means of a wing bolt 62 which fits into any of 3 or 4 holes 63 bored through nose piece 50.

At the lower extremity of nose piece 50 is a metal socket 64 hingedly connected thereto. The socket 64 extends outwardly from nose piece 50 at an angle adjustably variable through a chain 66 affixed at one end to an eye bolt 68 threaded into the socket of the handle and having its other end adjustably inserted over a hook bolt 70 threaded into nose piece 50. A pressure applying handle 72 is removably disposed in socket 64.

The above described head holder is applied to the neck and head of an animal whose head is inserted in the head stanchions 10, 12 of its stall by horizontally positioning securing bar 18 on stanchion uprights 10, 12 and fixed uprights 16 at a level so that the bend 28 accommodates the jaw of the animal in the manner shown in Figure 1. Wing nuts 24 are made to tighten U bolts 22 to the point where the stanchion uprights become immovable.

Head bar 30 is then placed on the animal's head, and nose piece 50 is longitudinally moved until nose guard 54 is properly positioned on the animal's head. Wing bolt 62 is tightened to then affix nose piece 50 relative to head bar 30. Cross bar 40 is moved forwardly until it contacts stanchion uprights 10, 12 and is then locked in that position by tightening wing bolt 46 into the closest of the countersunk depression 44. Thereby, lateral, forward, and backward movement of the animal in the stanchion is prevented, with the head being disposed in the proper location for the operation thereon. Downward pressure applied through the handle 72 will hold the animal's head down at the proper angle for the operation, e. g. dehorning, to be performed. It will be seen, therefore, that the head, once adjusted as described, is firmly held for the dehorning or other operation thereon, and that the described head holder construction permits this operation to be performed in the animal's own stall, thereby making it unnecessary for the veterinary surgeon or operator to provide and carry a special stanchion, and dispensing with the attendant labor of mounting and securing the same rigidly. Such operations, also, are more safely performed with the animal confined against body movement by the walls of its stall so that the head holder has this additional advantage in use.

If the animal is confined in a rigid type of stanchion such as the conventional wood stanchion, securing bar 18 need not be used. Head bar 30 and its associated cross bar 40 and nose piece 50 will satisfactorily hold the animal's head if used in the manner disclosed above.

While the specific construction described and illustrated represents a preferred form of construction, it is intended as illustrative rather than restrictive of the invention. It will, therefore, be understood that structural changes and adaptations to conditions of use and facilities of manufacture are contemplated within the spirit of the invention and the scope of the appended claims.

I claim:

1. A head holder comprising a head bar having a rear portion and a front portion adapted to overlie the neck and head, respectively, of an animal positioned in a head stanchion, a stanchion engaging cross bar adjustably mounted on said rear portion of said head bar, a nose piece adjustably mounted on the said front portion of said head bar, said nose piece having thereon a curved nose guard extending transversely of said head bar, a pressure applying arm mounted on said head bar, said arm being adjustable longitudinally of said bar, said arm being operable to exert a downward pressure on the head of an animal.

2. The apparatus of claim 1 wherein said pressure applying arm comprises a socket member hinged to and angularly adjustable relative to the nose piece, and a handle removably seated in said socket.

3. A head holder comprising a head bar having a rear portion and a front portion adapted to overlie the neck and head, respectively, of an animal positioned in a head stanchion, a stanchion engaging cross bar adjustably mounted on rear portion of said head bar, a nose piece movably mounted on the upper surface of the said front portion of said head bar, said nose piece having thereon a curved nose guard extending transversely of said head bar and a pressure applying arm adjustably mounted relative to said head bar and said nose piece for exerting a downward pressure on the head of an animal, a slide member secured to said nose piece and having end sections barely overlapping the under surface of said head bar whereby said nose piece may slide along said head bar and still leave a substantially unobstructed under surface thereon for contact with the nose of an animal, whereby any sized animal head may be fitted by said nose piece.

4. The apparatus of claim 3 wherein said curved nose guard is provided with a pair of end sections barely overlapping the under surface of said head bar whereby the functions of the nose guard and slide member are combined while retaining a substantially unobstructed under surface on said head bar.

5. In combination a swinging head stanchion, said stanchion comprising spaced uprights adapted to receive an animal's head, fixed upright rods positioned adjacent said stanchion, a horizontal rod rigidly connected to the fixed upright rods, said head stanchion being connected to said horizontal rod by a securing bar connected to said spaced uprights and to said upright rods, said securing bar having a bent portion shaped to receive an animal's jaw positioned between said uprights, a head holder comprising a head bar having a rear portion and a front portion adapted to overlie the neck and head, respectively, on an animal positioned in said head stanchion, a stanchion engaging cross bar adjustably mounted on said rear portion of said head bar, a nose piece adjustably mounted on said front portion of said head bar, said nose piece having thereon a curved nose guard extending transversely of said head bar, a pressure applying arm mounted on said head bar, said arm being adjustable longitudinally of said bar, said bent portion and said nose piece being adapted to receive the head of an animal therebetween with said stanchion engaging cross bar being positioned laterally of and in engagement with said spaced uprights on one side of the latter, with said head bar extending between said uprights, with said nose piece facing said securing bar with said head bar being transversely aligned with said securing bar bent portion, said nose piece being adjustable laterally of said bent portion, and said arm being operable to exert pressure on the head of an animal positioned between said bent portion of said securing bar and said head bar by movement of said nose piece toward said bent portion when said cross bar is engaged with both said stanchion uprights.

References Cited in the file of this patent

UNITED STATES PATENTS 1,727,290    Jones ------------------ Sept. 3, 1929